(12) United States Patent
Hurford

(10) Patent No.: US 6,237,342 B1
(45) Date of Patent: May 29, 2001

(54) GRAVITY MOTOR

(76) Inventor: John J. Hurford, 4716 Canterbury St., Westlake Village, CA (US) 91362

( * ) Notice: Subject to any disclaimer, the term of this patent is extended or adjusted under 35 U.S.C. 154(b) by 0 days.

(21) Appl. No.: 09/569,582

(22) Filed: May 11, 2000

(51) Int. Cl.[7] .................................................. F01K 1/00
(52) U.S. Cl. ................................................................ 60/721
(58) Field of Search ............................ 60/639, 675, 721

(56) References Cited

U.S. PATENT DOCUMENTS

| | | | |
|---|---|---|---|
| 4,195,483 | * | 4/1980 | Myers, Sr. et al. ................. 60/675 X |
| 4,372,123 | * | 2/1983 | Austin ................................. 60/675 X |
| 4,385,497 | * | 5/1983 | Scott ....................................... 60/639 |
| 5,873,249 | * | 2/1999 | Alkhami ................................. 60/639 |

* cited by examiner

Primary Examiner—Hoang Nguyen
(74) Attorney, Agent, or Firm—Jack Munro, Patent Agent

(57) ABSTRACT

A gravity motor which is formed of at least one motor unit which has at least one motor member fixed to an output shaft. The output shaft is rotationally mounted on a housing. The housing includes a guide surface. The motor member is low frictionally longitudinally movable relative to an output shaft. Each end of the motor member includes a weighted follower which is low frictionally movable relative to a guide surface. The rotation of the motor unit will cause one weighted follower to be moved toward the output shaft by the guide surface with the opposite weighted follower of the motor member being moved away from the output shaft. The result is gravity produces an overall clockwise torque on the motor member which causes rotation of the output shaft.

13 Claims, 5 Drawing Sheets

GRAVITY MOTOR

BACKGROUND OF THE INVENTION

1) Field of the Invention

The field of this invention relates to motors and more particularly to a motor which receives as input the force of gravity.

2) Description of the Prior Art

There are numerous different types of motors. The function of any motor is to receive input energy and produce an output usually in the form of a rotational torque through an output shaft. The output shaft can then be used to operate a load, such as a pump to pump water, to turn a wheel, operate a generator to produce electricity, and so forth.

In the past, there have been many attempts at trying to design a motor which utilizes the force of gravity as the input energy. Such a motor would be highly advantageous as it would not require the burning of any fossil fuels or the addition of any other type of energy, such as solar energy, in order to operate the motor. Gravity is a force with a constant value on earth. If this force could be harnessed, such a motor could be proved to be most beneficial not requiring the addition of use of any specific input energy, other than gravity, eliminating the need to burn fossil fuels, create solar energy or use wind energy. A gravity motor would be very much like a wind machine or a machine that operates by solar energy in that all three would be using natural, readily available sources of energy.

In the past, the attempts at producing a gravity motor have proved to be unsuccessful for the reason that the energy losses incurred by the motor in order to operate the motor were greater than the energy created and there was not output torque produced. It is most important that when creating a gravity motor that the energy losses be maintained at a minimum. In essence, the motor unit of the motor has to be almost free wheeling utilizing only a tiny amount of energy in the operation of the motor. The gravity motors of the past have not been able to be constructed to be almost free wheeling in nature.

SUMMARY OF THE INVENTION

A gravity motor which has at least one motor unit which is constructed to include at least one motor member but generally will include a plurality of motor members. A slidable connecting rod is mounted relative to a rotatable output shaft and is low frictionally, movable thereto. At each end of the connecting rod is a weighted follower. The output shaft is low frictionally rotationally mounted relative to a housing. The housing also has mounted thereto a guide surface on a ramp with this guide surface being located from the six o'clock to the nine o'clock position within the plane of rotation of the motor unit. This guide surface is unsymmetrical relative to the axis of rotation of the output shaft. As a weighted follower comes into contact with the guide surface, that particular weighted follower is moved closer, by being pushed, to the output shaft with the weighted follower at the opposite end of the connecting rod being moved further away from the output shaft. The weighted follower that is moved further away is now located at the twelve o'clock position of the plane of rotation so that this weighted follower is subjected to the downward pull of gravity upon leaving the twelve o'clock position until almost at the six o'clock position, and since this weighted follower is located further from the output shaft than the weighted follower that is now being moved from the six o'clock position to the twelve o'clock position, there is a net downward rotational torque that causes the output shaft to rotate clockwise. This is the output of the output shaft. This gravity motor will operate continuously.

The primary objective of the present invention is to construct a motor that utilizes the force of gravity as the input energy to produce a rotational torque as an output.

Another objective of the present invention is to construct a motor which is composed of relatively few parts thereby minimizing the amount of energy that is required to operate the motor.

Another objective of the present invention is to construct a motor which can be manufactured relatively inexpensively and thereby sold to the ultimate consumer at a relatively inexpensive price.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE PREFERRED EMBODIMENT

Figure 1:
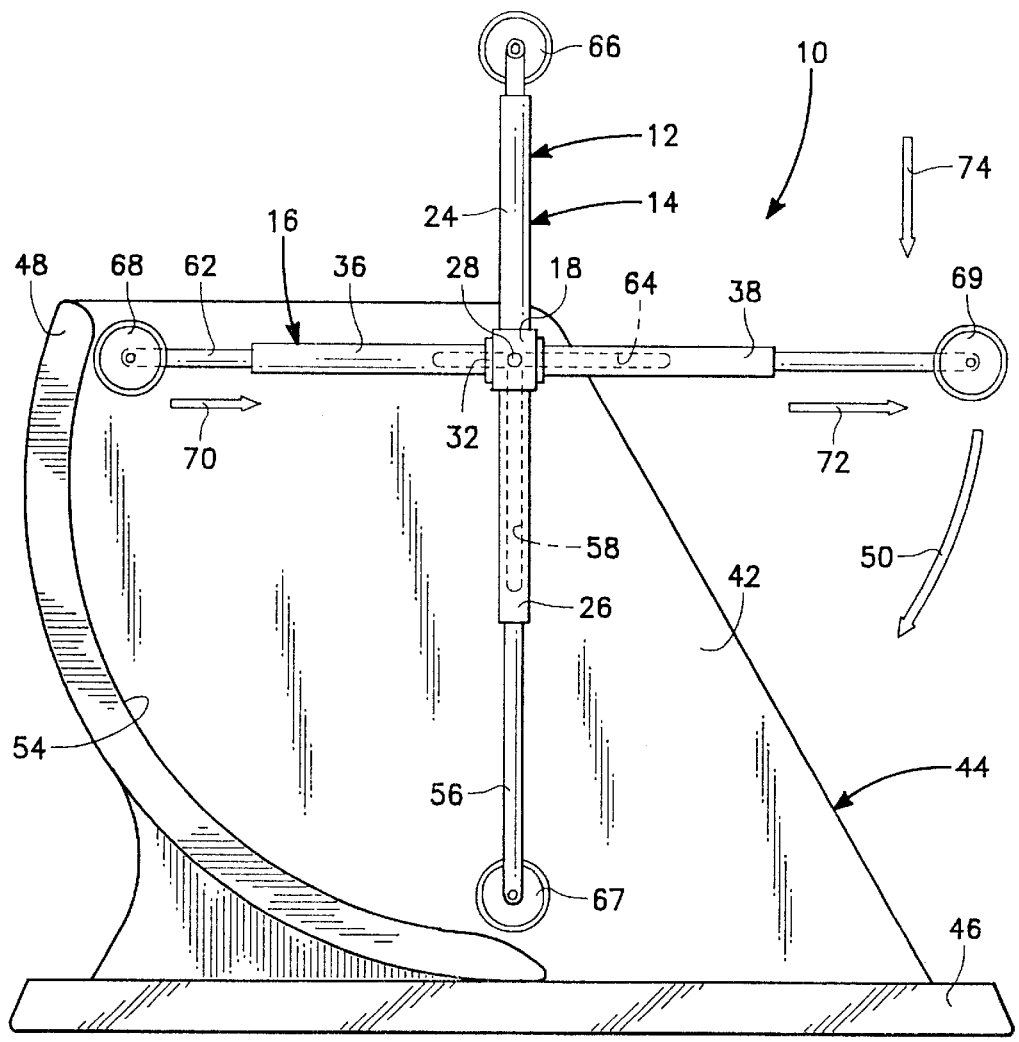
FIG. 1 is a front elevational view of a first embodiment motor unit of the gravity motor of the present invention depicting producing of a clockwise rotational output torque produced by the operation of the motor.

Referring particularly to the drawings, there is shown in FIG. 1 the first embodiment of gravity motor 10 of this invention. The gravity motor 10 is defined as a device which modifies energy from a natural source (gravity) by use and inclusion of other natural aspects including momentum and centrifugal forces in conjunction with leverage, weight and cyclic shift to cause a continuous unsymmetrical rotary motion which acts upon an shaft to transfer energy for useful and beneficial purposes. The gravity motor 10 is shown as having a motor unit 12. The motor unit 12 is shown as being constructed of a pair of motor members 14 and 16 which are mounted in a perpendicularly and radially crossed arrangement. The motor member 14 includes a hub 18. The hub 18 comprises a block of material which has a through opening 20. The through opening 20 has an elongated axis 22.

Mounted in conjunction with the through opening 20 and extending away from the hub 18 is a first sleeve 24. Also mounted in conjunction with the through opening 20 and being aligned with the first sleeve 24 is a second sleeve 26 with the second sleeve 26 extending in a direction away from the hub 18 which is opposite to the direction of extension of the first sleeve 24 away from the hub 18. The first sleeve 24 and the second sleeve 26 are of the same diameter and normally are of the same length. Both the first sleeve 24 and the second sleeve 26 are entirely hollow forming a hollow chamber which is of the same diameter and includes the through opening 20. An output shaft 28 is fixedly mounted to the hub 18. The output shaft 28 has an axis of rotation 30. This axis of rotation 30 is located perpendicular to the elongated axis 22.

There is also fixedly mounted to the hub 18 a second hub 32. The hub 32 is basically similar in construction to the hub 18 and includes a through opening 34 with a first sleeve 36 being fixedly mounted and extending away from one side of the hub 32 and a second sleeve being fixedly mounted to the hub 32 also extending outwardly therefrom with the sleeves 36 and 38 being aligned. There is an entirely hollow chamber formed by the sleeves 36, 38 and the through opening 34 defining an elongated axis 40. The elongated axis 40 is located perpendicular relative to the elongated axis 22 with the axis of rotation 30 also being located perpendicular to the elongated axis 40. The output shaft 28 would normally pass through the hub 32 and be low frictionally rotationally mounted onto a plate 42 of a housing 44. The housing 44 also includes a base 46 and an unsymmetrical ramp 48.

In referring specifically to FIG. 1, the reader is to be made aware that the motor unit 12 is to be rotatable clockwise as noted by the direction of arrow 50. The plane of rotation is defined as the plane of the paper of FIG. 1 which is defined as number 52 in FIG. 2. The unsymmetrical ramp 48 is concave when observed from the hub 18 defining a guide surface 54. The position of the ramp 48 is approximately from the six o'clock position in FIG. 1 to the nine o'clock position.

Mounted within the hollow chambers of the first sleeve 24 and the second sleeve 26 is a slidable connecting rod 56. The connecting rod 56 protrudes exteriorly of each of the sleeves 24 and 26. The connecting rod 56 includes an elongated slot 58. Mounted within the hollow chamber 60, which is formed by the interior of the first sleeve 36 and the second sleeve 38 and the through opening 34, is a similar connecting rod 62. The connecting rod 62 is identical in length to the connecting rod 56 and also identical in diameter. The connecting rod 62 is low frictionally movable so as to be most easily slidable within the hollow chamber 60. It is envisioned that possibly the exterior surface of the connecting rods 56 and 62 are covered with a very slippery plastic material such as is commonly sold under the trademark of "Teflon." Also, the interior of the hollow chamber 60 as well as the similar hollow chamber formed by the first sleeve 24 and the second sleeve 26 and through opening 20 might also possibly be coated with Teflon or impregnated with an oil for low frictional characteristics. The connecting rod 62 includes an elongated slot 64 which is of the same width and of the same length as the elongated slot 58. However, because of the orientation of the motor members 14 and 16, the elongated slot 64 is located perpendicular to the elongated slot 58. The output shaft 28 is conducted transversely through the elongated slots 58 and 64 with the output shaft 28 being low frictionally mounted on the plate 42. The revolving ends of the connecting rods 56 and 62 travel in an unsymmetrical configuration.

Figure 2:
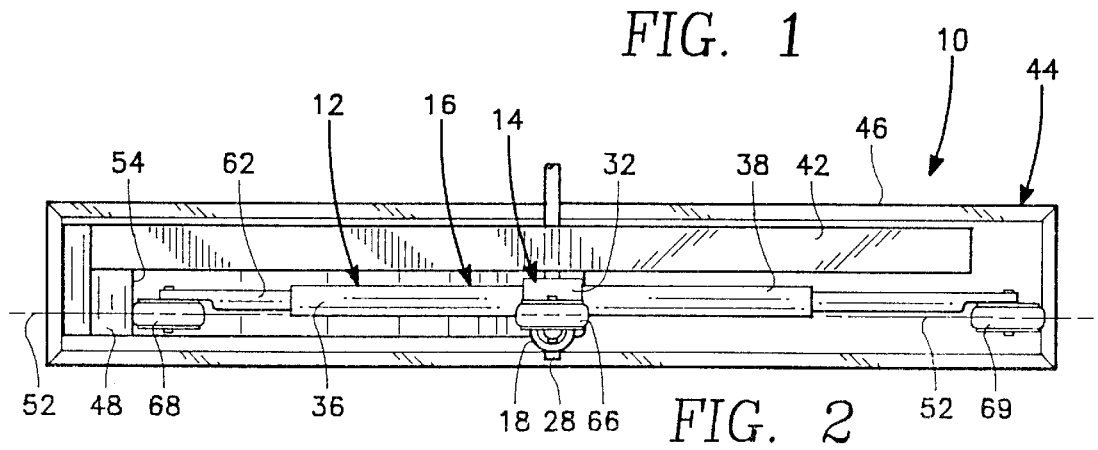
FIG. 2 is a top plan view of the motor unit of FIG. 1.
Figure 3:
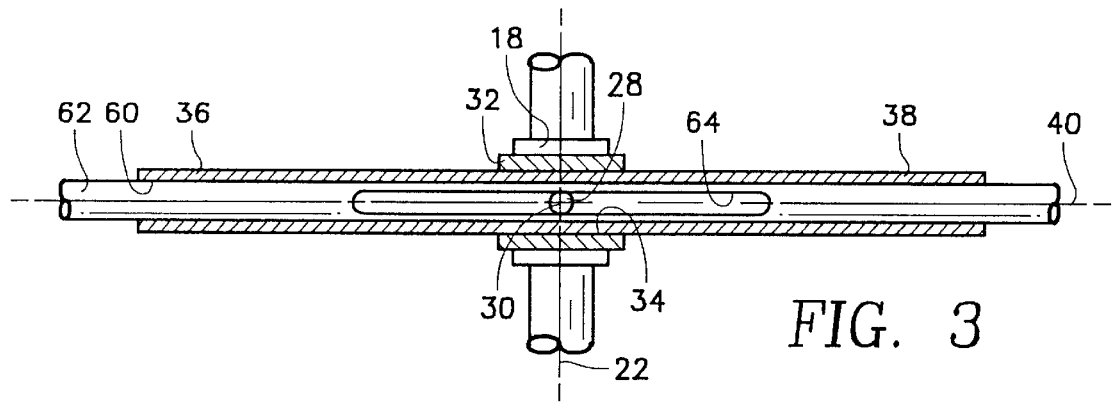
FIG. 3 is an enlarged view, partly in cross-section, of a hub and connecting rod arrangement of a motor unit which has a pair of motor members located in a cross mounted relationship.
Figure 4:
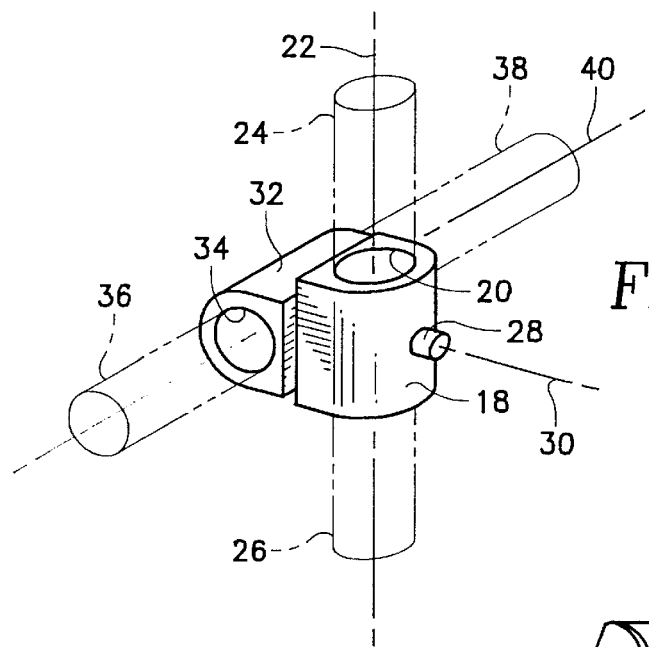
FIG. 4 is an exterior isometric view of the hub of FIG. 3.

Mounted at upper free outer end of the connecting rod 56 is a roller 66 with a second roller 67 being mounted at the lower free outer end of rod 56. In a similar manner mounted at the left free outer end of the connecting rod 62 is a roller 68 with a roller 69 mounted at the right free outer end of rod 62. Rollers 66, 67, 68 and 69 are exceedingly low frictionally mounted relative to their connecting rods 56 and 62. Each of the rollers 66, 67, 68 and 69 are to ride up the guide surface 54. As shown in FIG. 2, the rollers 66, 67, 68 and 69 are aligned on the plane of rotation 52 for balance reasons to make the motor 10 operate as smoothly as possible.

The operation of the motor unit 12 of this invention is as follows. There is to be manually or by electric motor applied an initial torque in the direction of arrow 50 which starts the motor unit 12 to rotate clockwise. When roller 67 contacts the portion of the guide surface 54 that is located at the six o'clock position, and as the motor unit 12 continues to rotate, the position of the guide surface 54 is such that the roller 67 will be moved toward hub 18 until the rollers 67 will be located at a position closest to the hub 18 which is shown by a roller 68 relative to the hub 32 in FIG. 1. This causes the roller 69 to be located at a furthest away position from the hub 32. In referring particularly to FIG. 1, the roller 68 is positioned about two and one-quarter inches away from the axis of rotation 30 while the roller 69 is located about two and three-quarter inches away from the axis of rotation 30. The inward direction of the connecting rod 62 by the roller 68 being moved toward the hub 32 is depicted by arrow 70 and the outward direction of roller 69 is depicted by arrow 72. The result is the force of gravity, which is constant and in the direction of arrow 74, exerts a clockwise torque on the roller 69 and a counterclockwise torque on the roller 68. The rollers 66, 67, 68 and 69 are to be weighted in order to maximize this torque. Because the roller 69 is located further from the hub 32 than the roller 68, there is a net overall torque in the direction of arrow 50. This overall torque produces the rotation of the output shaft 28. As long as this overall torque is greater than the losses that are inherently created in the operation of the gravity motor 10 of this invention, then the motor member 16 will continue to rotate clockwise. The same is true for the motor member 14.

Although there are shown only two in number of the motor members 14 and 16, it is considered to be within the scope of this invention there may be utilized six, eight or even more of the motor members that could be mounted resembling a radial configuration of the spokes of a wheel. A load (not shown) is to be connected to receive the energy of the output shaft 28. Normally, the net energy produced is to be relatively low and therefore the load would have to be such that it is designed to be operable with this low amount of energy. A typical such load would be to operate a pump that pumps water from one location to another, turn a generator to produce a small amount of electricity, and so forth.

Figure 6:
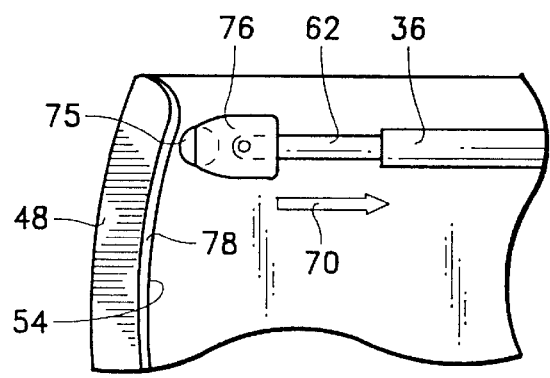
FIG. 6 is a front elevational view of the outer end of the connecting rod showing a different type of weighted follower than is shown in FIGS. 1, 2 and 5.

Referring particularly to FIG. 6, instead of using of the rollers 66, 67, 68 and 69, it is considered to be within the scope of this invention that one could use a pointed plug 76 with or without a roller bearing 75 in place of each roller. The pointed end of the pointed plug 76 is to come into contact and slide with the guide surface 54 which could be the exterior surface of a Teflon coating 78 which is formed on the inner surface of the unsymmetrical ramp 48. In reference to FIG. 6, like numerals have been utilized to refer to like parts in comparing FIG. 6 to FIG. 1.

Figure 5:
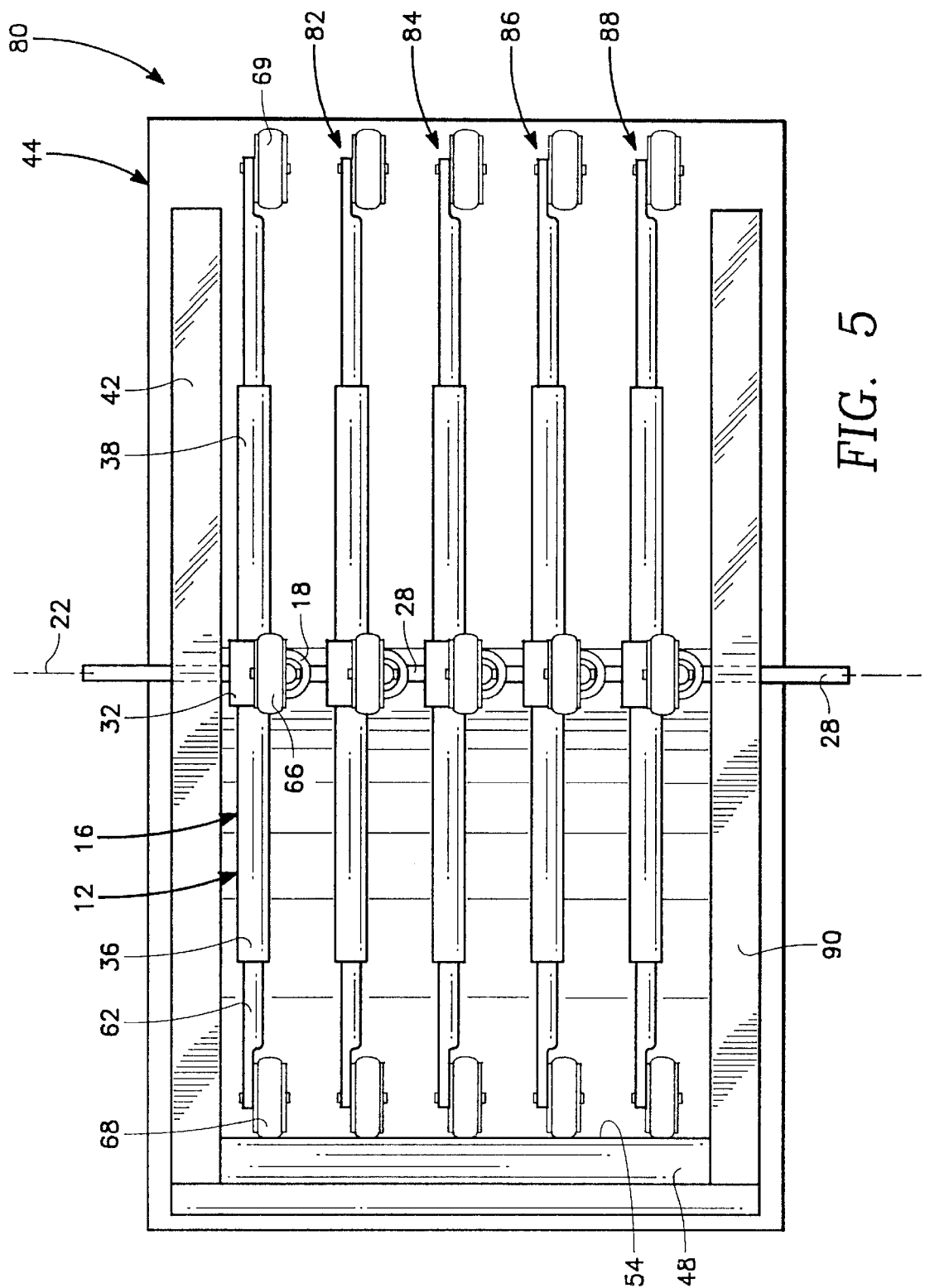
FIG. 5 is a top plan elevational view similar to FIG. 2 but of a gravity motor which has a plurality of motor units located in a ganged relationship.

Referring particularly to FIG. 5, there is shown a gravity motor 80 which again utilizes like numerals to refer to like parts in comparison to FIG. 2. However, instead of having a single motor unit 12, there is also included motor units 82, 84, 86 and 88 located in a ganged relationship all connected to the output shaft 28. The inner end of the output shaft 28 is mounted as before within the plate 42 with the outer end of the output shaft 28 being mounted within a plate 90 of the housing 44. The motor units 82, 84, 86 and 88 are essentially identical and similar in construction to the motor unit 12. The position of each of the motor units 12, 82, 84, 86 and 88 could be such that the rollers 66 and 68 between the motor units are in transverse alignment or could be staggered and more than likely would be staggered to achieve a smooth running output torque within the output shaft 28.

Figure 7:
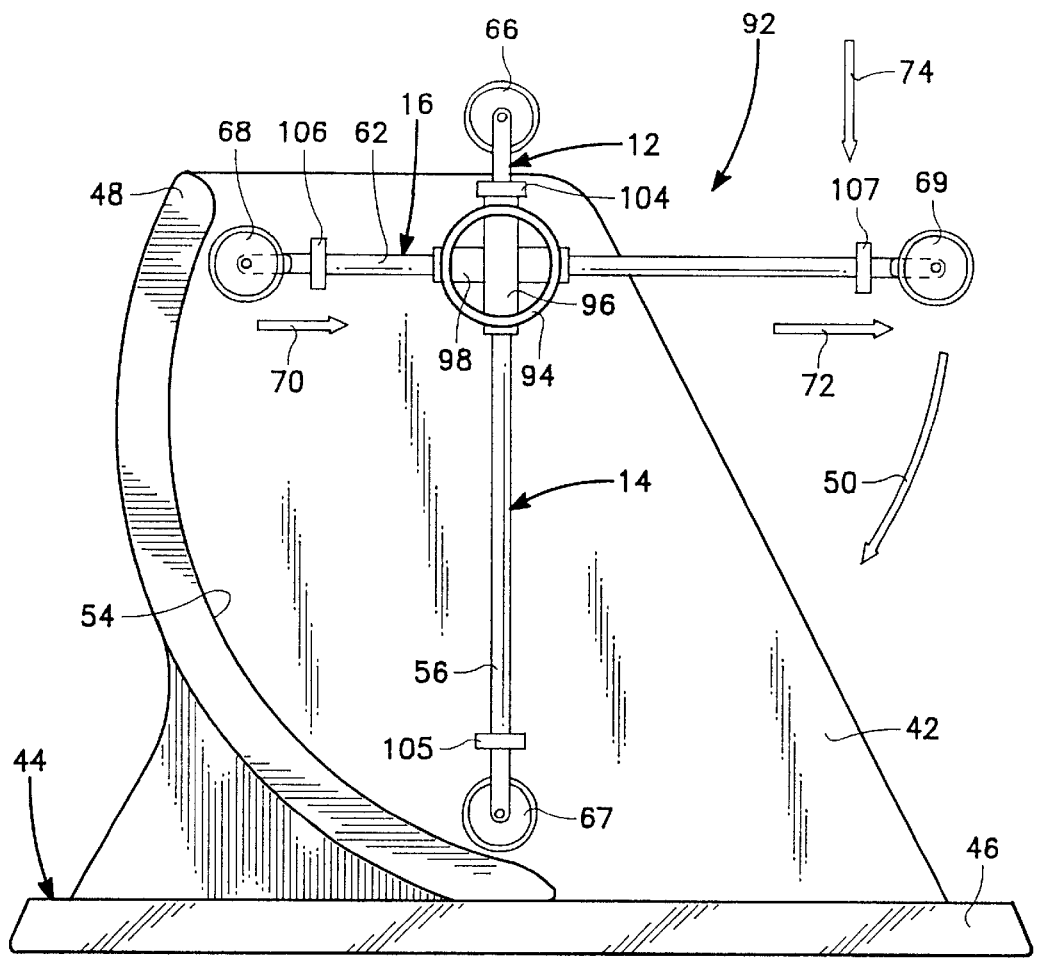
FIG. 7 is a front elevational view of a second embodiment motor unit of a gravity motor of this invention again depicting producing of clockwise rotational output torque by the operation of the motor.
Figure 8:
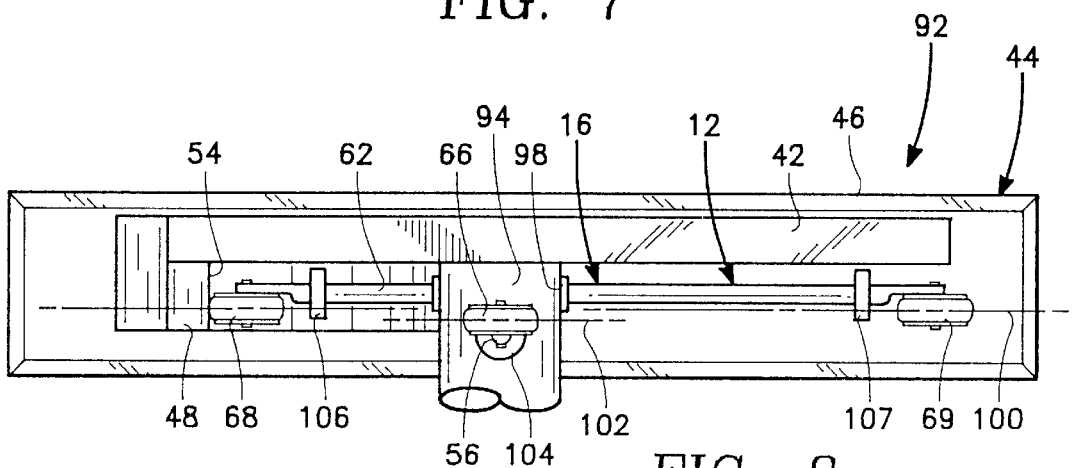
FIG. 8 is a top plan view of the motor unit of FIG. 7.
Figure 9:
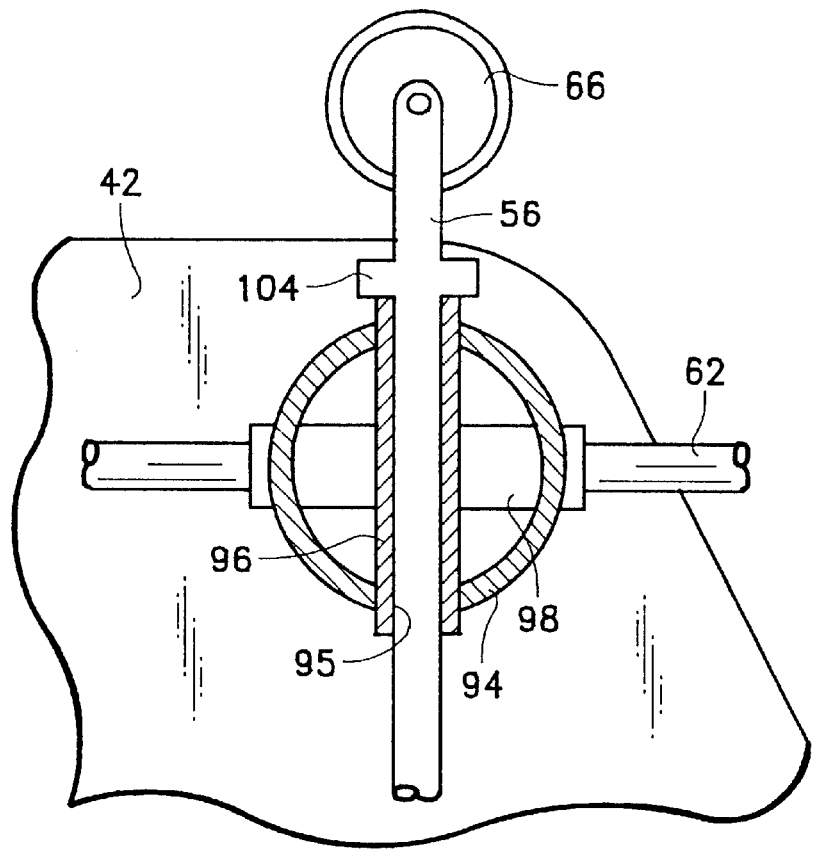
FIG. 9 is an enlarged, partly in cross-section, front elevational view showing the arrangement of the connecting rods of the second embodiment motor unit relative to the output shaft.

Referring particularly to FIGS. 7–9 of the drawings, there is shown a second embodiment 92 gravity motor of this invention. Within the second embodiment 92, like numerals have been utilized relative to the first embodiment 10 of this invention to refer to like parts. The primary distinction of the second embodiment 92 is that the output shaft 94 is substantially larger in diameter. The connecting rod 56 is conducted through a through opening 95 in a sleeve 96 that is mounted diametrically through the output shaft 94. The connecting rod 62 is also low frictionally, slidingly movable within a sleeve 98 that is also diametrically mounted within the output shaft 94. The sleeves 96 and 98 are offset slightly from each other with the sleeves 96 and 98 oriented in a perpendicular relationship relative to each other. The rollers 68 and 69 are mounted on a plane 100 with the rollers 66 and 67 being mounted on a plane 102. As previously referred to in the first embodiment 10 of this invention, the rollers 66 and 68 were located on the same plane 52. However, within the second embodiment of this invention, the rollers 66, 67, 68 and 69 are not on the same plane but the planes slightly spaced from each other as shown by numerals 100 and 102 in FIG. 8. This offsetting of the rollers 66, 67, 68 and 69 is required in order for the sleeves 96 and 98 to not interfere with each other.

The output shaft 94 is low frictionally mounted by a bearing assembly, which is not shown, within the plate 42. It can thusly be seen that as the rollers 66, 67, 68 and 69 move up the guide surface 54 that the connecting rods 56 and 62 are extended in the same manner as previously described in relation to the first embodiment 10. Fixedly mounted on the connecting rod 56 directly adjacent roller 66 is a stop 104 with a stop 105 being fixed on rod 56 directly adjacent roller 67. Each stop 104 is capable of abuttingly contacting and end of the sleeve 96 which limits the amount of lineal movement of the connecting rod 56. In a similar manner mounted on the connecting rod 62 is a stop 106 directly adjacent roller 68 and stop 107 directly adjacent roller 69 which function to limit the amount of movement of the connecting rod 62 relative to the sleeve 98. The reason for the stops 104, 105, 106 and 107 is so as to keep the rollers 66, 67, 68 and 69 from directly contacting their respective sleeves 96 and 98 and to add weight to the ends of slidable connecting rods 56 and 62.

Figure 10:
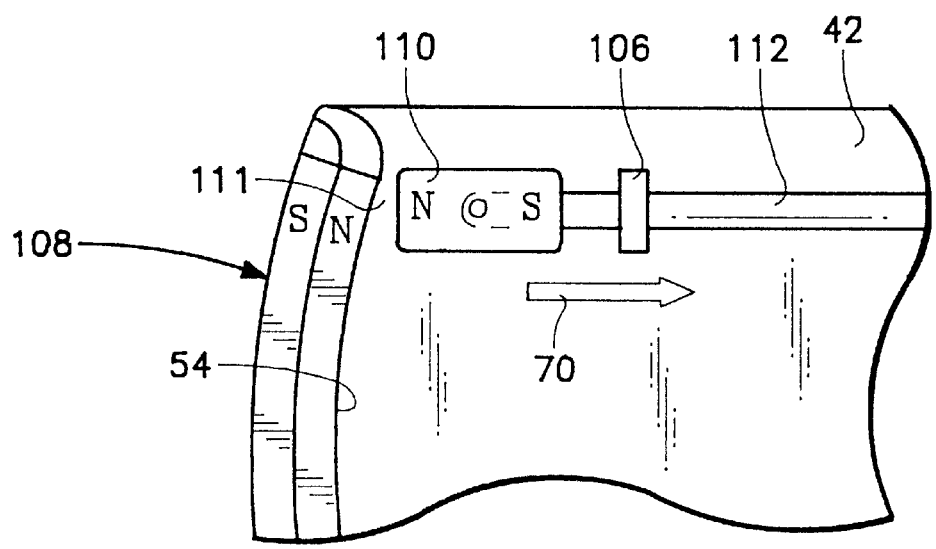
FIG. 10 is a front elevational view of a modified form of connecting rod in relation to the guide plate.

Referring particularly to FIG. 10 of the drawings, there is shown a different type of structure that could be used instead of the rollers 66, 67, 68 and 69 and also instead of the pointed plug 76 of FIG. 6. Guide ramp 108, which is equivalent to the guide ramp 48, is constructed of a magnet having a north pole N and a south pole S shown in FIG. 10. The guide surface 54 is to function as is normal in relation to a weighted follower 110. The weighted follower 110 is also a magnet having a north pole N and a south pole S with its north pole N to interface with the north pole surface of the ramp 48. The weighted follower 110 is mounted on a connecting rod 112 which is equivalent to the previously mentioned connecting rod 62. The weighted follower 110 becomes located directly adjacent the guide surface 54 but doesn't contact such. Because there are repelling poles (N vs. S) between the magnets of the weighted follower 110 and the guide ramp 108, there will be an automatic repelling force created. This repelling force will cause the connecting rod 112 to be moved away from the guide surface 54 and be located a short gap 111 from surface 54. This will cause the weighted follower (which is not shown) that is equivalent to weighted follower 110 that is mounted on the opposite end of the connecting rod 112 to be extended in an outward direction away from sleeve 96 or the hub 18 thereby producing the net downward torque by gravity required in order to achieve operation of the gravity motor 10 and 92 of this invention because the position of guide ramp 108 causes the sliding of the connecting rod 112 outward to the right in FIG. 10.

The present invention may be embodied in other specific forms without departing from the essential attributes thereof. Reference should be made to the appending claims rather than the foregoing specification as indicating the scope of the invention.

What is claimed is:

1. A gravity motor having at least one motor unit which is formed of at least one motor member which comprises:

an output shaft having an axis of rotation, said output shaft being rotatably mounted to a housing;

a hub having a through hole defining an elongated axis, said output shaft being fixed to said hub so said axis of rotation is located substantially perpendicular to said elongated axis;

a first sleeve mounted to and extending from said hub, said elongated axis being centrally located relative to said first sleeve;

a second sleeve mounted to and extending from said hub, said elongated axis being centrally located relative to said second sleeve, said second sleeve located in alignment with said first sleeve;

a connecting rod mounted within said first sleeve and said second sleeve and said through hole, said connecting rod being low frictionally longitudinally movable relative to said first sleeve and said second sleeve and said through hole, said connecting rod having free ends one of which protrudes exteriorly of said first sleeve and the other of which protrudes exteriorly of said second sleeve;

a weighted follower mounted on each said free end with there being a pair of said weighted followers;

a guide surface mounted on said housing, said guide surface to be contactable by each of said weighted followers; and whereby said guide surface causes said connecting rod to extend outwardly so said follower not in contact with said guide surface is located a substantially greater distance from said hub than said follower in contact with said guide surface which results in an overall clockwise torque caused by gravity which thereby causes rotation of said output shaft about said axis of rotation.

2. The gravity motor as defined in claim 1 wherein:

said weighted follower comprising a wheel.

3. The gravity motor as defined in claim 1 wherein:

said weighted follower comprising a pointed member which rides against a slippery coating adhered to said guide surface.

4. The gravity motor as defined in claim 1 wherein:

said weighted follower comprises a first magnet, said guide surface comprising a second magnet, said first magnet and said second magnet having surfaces which are directly abutting which have the same polarity therefore are repelling.

5. The gravity motor as defined in claim 1 wherein:

a plurality of said motor units ganged together and all mounted on said output shaft.

6. The gravity motor as defined in claim 1 wherein:

each said motor unit includes a pair of said motor members located in a crossed configuration.

7. The gravity motor as defined in claim 1 wherein:

said connecting rod having an elongated longitudinal slot, said output shaft passes through said slot.

8. A gravity motor having at least one motor unit which is formed of at least one motor member which comprises:

an output shaft having an axis of rotation, said output shaft being rotatably mounted to a housing;

a connecting rod diametrically mounted within said output shaft, said connecting rod being low frictionally longitudinally movable relative to said output shaft, said connecting rod having free ends;

a weighted follower mounted on each said free end with there being a pair of said weighted followers;

a guide surface mounted on said housing, said guide surface to cause movement of a said weighted follower that is located directly adjacent said guide surface in a lineal direction toward said output shaft; and whereby said guide surface causes said connecting rod to extend outwardly so said follower not located nearest said guide surface is located a substantially greater distance from said output shaft than said follower located nearest said guide surface which results in an overall clockwise torque caused by gravity which thereby causes rotation of said output shaft about said axis of rotation.

9. The gravity motor as defined in claim 8 wherein:

said weighted follower comprising a wheel.

10. The gravity motor as defined in claim 8 wherein:

said weighted follower comprising a pointed member which rides against a slippery coating adhered to said guide surface.

11. The gravity motor as defined in claim 8 wherein:

said weighted follower comprises a first magnet, said guide surface comprising a second magnet, said first magnet and said second magnet having surfaces which are directly abutting which have the same polarity therefore are repelling.

12. The gravity motor as defined in claim 8 wherein:

a plurality of said motor units ganged together and all mounted on said output shaft.

13. The gravity motor as defined in claim 8 wherein:

each said motor unit includes a pair of said motor members located in a crossed configuration.

\* \* \* \* \*